United States Patent Office

3,582,414
Patented June 1, 1971

3,582,414
METHYL ALANE TERMINATED BERYLLIUM HYDRIDE LIQUIDS
Edwin F. C. Cain, Ventura, Frank D. Gunderloy, Jr., Santa Susana, Louis R. Grant, Jr., Los Angeles, and Milton Kirsch, Canoga Park, Calif., assignors to North American Aviation, Inc., El Segunda, Calif.
No Drawing. Filed Dec. 28, 1966, Ser. No. 607,132
Int. Cl. C06b *19/00;* C07f *5/06*
U.S. Cl. 149—109                                    4 Claims

---

ABSTRACT OF THE DISCLOSURE

Methyl alane terminated beryllium hydride liquids and their preparation. Gelled liquid rocket fuel compositions comprising methyl alane terminated beryllium liquids and solid beryllium hydride.

---

Beryllium hydride is a useful compound in the area of rocket fuels. High specific impulses can be achieved by its inclusion in rocket fuel compositions. However, at normal temperatures and pressures, beryllium hydride is a solid. Beryllium hydride is therefore unsuitable, in its pure form, as a storable liquid rocket fuel. It must be compounded with other, less energetic, storable fuels if a liquid is desired. Naturally, the combination of beryllium hydride and other storable fuels results in a composite fuel which is less energetic than beryllium hydride. Frequently the composite composition is not stable at normal temperatures and pressures. Such instability is often due to incompatibility of the $BeH_2$ and storable liquid fuel.

It is an object of this invention to provide a new class of liquid derivatives of beryllium hydride, and a method for their preparation.

It is a further object of this invention to provide new alane terminated beryllium hydride derivatives, and a method for their preparation.

It is a still further object of this invention to provide new liquid rocket fuel compositions, and methods for their preparation.

Other and more specific advantages of this invention will become apparent from the following description:

The objects of this invention are accomplished by reacting $BeH_2$ with a compound selected from the group consisting of $Al(CH_3)_3$ and $(CH_3)_2AlH$. These aluminum compounds are described as alanes. The reaction produces a stable, nonvolatile mobile liquid beryllium hydride compound which is alane terminated. The specific alane terminated beryllium hydride achieved from the reaction of $BeH_2$ and the aluminum compound is a function of temperature, reaction time, ratio of reactants, and starting alane. In general, the reaction of $BeH_2$ with the aluminum compound should take place at temperatures above about 110° C. and below about 200° C. The reaction should take between about 2 and about 100 hours. The reactants should be present in molar ratios of $BeH_2$ to aluminum compound of from 0.1 to 100. Ratios of about 2 to 10 are preferred.

$Al(CH_3)_3$ and $(CH_3)_2AlH$ are pyrophoric materials; they must not be allowed to come in contact with air. $BeH_2$, while not spontaneously igniting in air, would ignite if contacted with burning $Al(CH_3)_3$ or $(CH_3)_2AlH$. Accordingly, the reaction of the instant invention must be performed either in a vacuum or under an inert gas blanket.

The reaction of $BeH_2$e with $Al(CH_3)_3$ is temperature dependent; at temperatures below 110° C. the rate of reaction is slow. The temperature is quite critical, as no reaction will occur below about 90 to 100° C. At 110 to 130° C., $BeH_2$ reacts smoothly with $Al(CH_3)_3$, with only a trace of noncondensible gases evolved. The rate of reaction of $BeH_2$ with $Al(CH_3)_3$ at 130° C. fits a simple second-order rate expression. The disappearance of the reactants when reacted at 130° C. is near-quantitative after 48 hours. The reaction should not be conducted above about 200° C., as $BeH_2$ decomposes at about that temperature. Temperatures of about 130° C. are preferred for the reaction of the instant invention, as this temperature gives the highest percentage conversion without detrimental side-products caused by excessive temperatures. The $BeH_2$ must be in contact with the liquid phase; small amounts of $BeH_2$ on the walls of the vessel just above the liquid level are not affected.

The series of experiments used for establishing the rate of reaction of $BeH_2$ with $Al(CH_3)_3$ also served to indicate how the compositions of the alane-terminated beryllium hydride liquids varied with reaction time. A trend toward decreased methyl group content in the product with longer reaction time was apparent. In any case, the product is a beryllium chain substituted with hydrogen and methyl groups, terminated by alane groups:

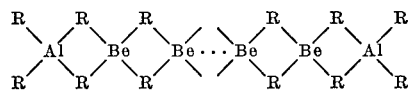

where the dotted line indicates an indeterminate chain length and R is H or $CH_3$.

As indicated above, the rate of reaction between $BeH_2$ and $Al(CH_3)_3$ is temperature- and time dependent; for example, appreciable amounts of insoluble materials remain after short reaction times even at 130° C. The nature of the unreacted species remaining after reaction of $Al(CH_3)_3$ and $BeH_2$ (2.3:1 mole ratio) at 120° C. and 16 hours was investigated. Isolation and analyses of the insoluble material showed it to be $BeH_2$ of a purity similar to that used at the start of the reaction.

Physical characterization work of the alane terminated beryllium hydride materials has been performed. The data collected for the product resulting from a reaction of $Al(CH_3)_3$ and $BeH_2$ are:

Density—0.72 gm./cc. (29° C.)
Thermal stability (gas evolution rate)—$5.1 \times 10^{-2}$ cc./min./lb. at 71° C. (160° F.); $1.2 \times 10^{-4}$ cc./min./lb. at ambient temperature
Theoretical specific impulse (shifting equilibrium, 1000—14.7 p.s.i.a.), $H_2O_2$ oxidizer—297 seconds Additional work has shown that the viscosity of the product material can be varied simply by the addition or removal of $Al(CH_3)_3$ from the complex. This removal may be achieved by refluxing at the boiling point of $Al(CH_3)_3$, or by exposing the material to a vacuum. As the material loses $Al(CH_3)_3$, it becomes more viscous, ultimately reverting to a composition whose viscosity approaches that of the starting $BeH_2$. It has been found that this process is reversible. If the means used to remove $Al(CH_3)_3$ is removed, and liquid $Al(CH_3)_3$ is added to the material, the material will become progressively less viscous, once again becoming a clear mobile liquid, whose viscosity will eventually approach that of $Al(CH_3)_3$. If desired, this process may be again reversed, by removing $Al(CH_3)_3$ by means such as those described. Despite this behavior, it is to be understood that the process of the invention is a true chemical reaction, and not a simple dissolving of the $BeH_2$ in the alane. This conclusion is partially dictated by the observation that the $Al(CH_3)_3$ pumped off is mixed with some $(CH_3)_2AlH$, indicating a methylation of the $BeH_2$. Further, a final liquid product of the reaction of $Al(CH_3)_3$ and $BeH_2$ is believed to be a chain structure of beryllium methyl groups, and hydrogen, terminated by alane groups, since only in such a structure can the beryllium atoms be tetracovalent, and the structure also be consistent with the elemental analyses. Elemental analyses consist of hydrolyzing the product with aqueous acid measuring the amounts of methane and hydrogen evolved, and determining the amounts of beryllium and aluminum in the aqueous phase. The change in physical character of the alane terminated beryllium hydride liquid must therefore be caused by the stripping of terminating alane groups from $BeH_2$ polymeric structures. This allows the stripped polymeric structures to combine, resulting in longer chain length and increased viscosity.

Dimethylalane, $(CH_3)_2AlH$, reacts in a similar fashion to trimethylalane, $Al(CH_3)_3$. However, dimethylalane is somewhat less reactive toward $BeH_2$ than trimethylalane. Vacuum pumping similar to that used in the $Al(CH_3)_3$/$BeH_2$ reaction to remove excess aluminum trimethyl did not result in complete removal of the excess dimethyl alane from a dimethylalane reaction system.

The light metal liquids of the instant invention are useful as intermediates in the production of liquids terminated by other light metal groups. Further, the light metal liquids of the instant invention have some utility as liquid rocket fuels. However, their use as a liquid rocket fuel can be improved upon by combining them with other compounds.

It has been discovered that a highly effective liquid rocket fuel can be made by gelling beryllium hydride and the disclosed novel compounds. Such a gel composition has a theoretical specific impulse approaching that of beryllium hydride, while having the additional favorable property of being pumpable. Being pumpable, it has great utility in liquid rocket applications. Furthermore, since beryllium hydride and the disclosed novel compounds are related chemically, they are compatible and the gels are stable.

Since alane terminated beryllium hydride liquids behave generally as non-polar substances they can be gelled with prior art materials suitable for gelling hydrocarbons, e.g. soaps and pyrogenic silica. Of course, the gelling agent must be such that it will not react with the alane terminated beryllium hydride liquid. One suitable form of pyrogenic silica is sold under the tradename Cab-O-Sil M-5 by Cabot Corporation.

The amount of gelling agent used in the instant invention may be functionally described as that required to gel the fuel composition. This amount is less than 2 weight percent.

In general, gelled propellant can contain from 30 to 50 weight percent $BeH_2$, from 0.2 to 2 percent gelling agent, and from 50 to 70 percent of the alane terminated compounds of the instant invention.

The following examples illustrate the novel process and compositions of this invention.

EXAMPLE I 0.110 gram of $BeH_2$ and 2.21 grams of $Al(CH_3)_3$ were placed in an 8-milliliter heavy-wall glass reactor fitted with a Fischer-Porter needle valve and attached to a vacuum system. The mixture was heated between 90 to 100° C. for 24 hours without visible change and then between 110 to 120° C. for 2 days. At the end of the 2 days most of the solid had disappeared except for a few white particles above the liquid level, and a grey "sludge" in the bottom of the reactor. Fractionation recovered less than a standard cubic centimeter of gas passing a trap at −80° C., unreacted $Al(CH_3)_3$, and left a low-volatility liquid and a small amount of solid (white and grey particles mixed) in the reactor. Filtration separated the solid, which weighed 0.004 gram. Analyses of the liquid showed: hydrolysis gas, 0.056 mmole/mg., the gas being 62.5 mole percent $CH_4$ and 37.5 mole percent $H_2$; Be, 15.8 percent, and Al 23.6 percent.

EXAMPLE II

In a second run, the above mixture of $BeH_2$ and

was heated for 1 week at 90 to 100° C. without apparent dissolution of the Beane, which then readily dissolved when the temperature was raised to 120° C.

EXAMPLE III

The preparation of the alane terminated beryllium hydride liquid was carried out by dissolving pyrolytic $BeH_2$ in trimethyl aluminum at elevated temperatures. At the refluxing temperature of $Al(CH_3)_3$, 126° C., the reaction was complete in 15 to 16 hours. The viscosity of the final liquid was found to be dependent on the length of evacuation on the high vacuum system. $Al(CH_3)_3$ could be removed with prolonged pumping, the liquid became more viscous as $Al(CH_3)_3$ was removed. The desired viscosity could thus be easily attained by the addition or removal of a small amount of $Al(CH_3)_3$. Only a small amount of $Al(CH_3)_3$ was necessary to change the viscosity substantially. The average empirical formula of the liquid prepared can be written in the following manner, based on 97 percent analytical mass balance,

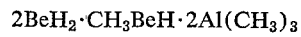

EXAMPLE IV 92.3 mmoles of beryllium hydride was placed in a thick-walled glass reactor equipped with a Fischer-Porter needle valve. 156 mmoles $Al(CH_3)_3$ was added and the mixture was heated at 85 to 120° C. in an oil bath over a period of 4 days. The solid was then filtered, washed with benzene, and dried on the vacuum system. Approximately 30 percent of the original solid was recovered. Upon removal of the benzene and excess $Al(CH_3)_3$, 2.9 grams of a clear viscous syrup was obtained. 0.45 gram of fresh $Al(CH_3)_3$ was added to the thick syrup to thin it out to give a reasonably mobile liquid. A sample of this liquid was analyzed and revealed the following: gas evolved on hydrolysis, a 61.7 mmoles/gm. sample of which included 59.0 mole percent $CH_4$, and 38.7 mole percent $H_2$; Be, 13.95 wt. percent; and Al, 27.6 wt. percent.

EXAMPLE V 45.4 mmoles $BeH_2$ was placed in a round-bottomed flask equipped with a water condenser. 156 mmoles of $Al(CH_3)_3$ was added to the $BeH_2$ and refluxed under a blanket of dry nitrogen. During overnight refluxing most of the solid had gone into solution and a small amount of gray material was deposited on the wall. The reaction mixture was filtered and the solid was washed with $Al(CH_3)_3$ and dried under evacuation. Approximately 12 wt. percent of the original solid was recovered. Excess $Al(CH_3)_3$ was stripped off the filtrate on the vacuum system. 2.19 grams of a clear, mobile liquid was obtained as the final product. Analysis of this liquid revealed the following: gas evolved on hydrolysis, a 60.1 mmoles/gm. sample which included 62.6 mole percent $CH_4$ and 35.4 mole percent $H_2$; Be, 12.33 wt. percent; and Al, 22.5 wt. percent.

EXAMPLE VI 1 gram of $BeH_2$ was pretreated with 5 milliliters of $Al(CH_3)_3$ in 15 milliliters of benzene overnight at room temperature to remove any reactive groups, such as hydroxyl. The resulting solid was filtered, washed with benzene, and dried in vacuo. 90 milligrams of this pretreated $BeH_2$ was added with a funnel to 310 mg. of the liquid of Example III. The thermal stability of this mixture at 165° F. was the same as that of the liquid alone, demonstrating the chemical compatibility of $BeH_2$ and the liquid.

EXAMPLE VII 35 volume parts of solid $BeH_2$ was mixed with one and one half percent of pyrogenic silica. The mixed solids were added at room temperature to 63½ volume parts of the alane terminated beryllium hydride of Example I. Manual stirring produced immediate gelation at room temperature with no visible reaction. The gel formulation remained stable for more than 6 months.

Since it is obvious that many changes and modifications can be made in the above-described details without departing from the nature and spirit of the invention, it is to be understood that the invention is not to be limited thereto except as set forth in the appended claims.

We claim:
1. The process of producing a mobile non-volatile liquid comprising:
   reacting between 100° C. and 200° C. $BeH_2$ and a compound selected from the group consisting of $Al(CH_3)_3$ and $(CH_3)_2AlH$, and separating the resulting product.
2. The proces of claim 1 wherein $Al(CH_3)_3$ is reacted with $BeH_2$ at about 130° C.
3. The mobile product produced by reacting between about 100° C. and 200° C. $BeH_2$ with a compound selected from the group consisting of $Al(CH_3)_3$ and $(CH_3)_2AlH$.
4. The mobile product produced by reacting at about 130° C. $BeH_2$ and $Al(CH_3)_3$.

References Cited
UNITED STATES PATENTS

| | | | |
|---|---|---|---|
| 2,765,329 | 10/1956 | Lindsey, Jr. | 260—448 |
| 3,247,261 | 4/1966 | D'Alelio | 149—87X |

LELAND A. SEBASTIAN, Primary Examiner

U.S. Cl. X.R.

149—18, 87; 260—448